US012792241B2

(12) United States Patent
Li et al.

(10) Patent No.: US 12,792,241 B2
(45) Date of Patent: Nov. 10, 2026

(54) IMAGE MANAGEMENT METHOD, CHIP, IMAGE TRANSMISSION METHOD AND ELECTRONIC DEVICE

(71) Applicants: VERISILICON MICROELECTRONICS (CHENGDU) CO., LTD., Chengdu (CN); VERISILICON MICROELECTRONICS (SHANGHAI) CO., LTD., Shanghai (CN)

(72) Inventors: Jia Li, Chengdu (CN); Xinghong He, Chengdu (CN); Ting Ye, Chengdu (CN); Huiming Zhang, Chengdu (CN)

(73) Assignees: VERISILICON MICROELECTRONICS (CHENGDU) CO., LTD., Chengdu (CN); VERISILICON MICROELECTRONICS (SHANGHAI) CO., LTD., Shanghai (CN)

( * ) Notice: Subject to any disclaimer, the term of this patent is extended or adjusted under 35 U.S.C. 154(b) by 214 days.

(21) Appl. No.: 18/832,981

(22) PCT Filed: Sep. 22, 2023

(86) PCT No.: PCT/CN2023/120710
§ 371 (c)(1),
(2) Date: Jul. 25, 2024

(87) PCT Pub. No.: WO2025/060067
PCT Pub. Date: Mar. 27, 2025

(65) Prior Publication Data

US 2026/0178207 A1 Jun. 25, 2026

(51) Int. Cl.
*G06F 3/06* (2006.01)

(52) U.S. Cl.
CPC .......... *G06F 3/0638* (2013.01); *G06F 3/0608* (2013.01); *G06F 3/0673* (2013.01)

(58) Field of Classification Search
CPC .... G06F 3/0638; G06F 3/0608; G06F 3/0673; G06F 16/51; G06F 16/50; G06F 18/00;
(Continued)

(56) References Cited

U.S. PATENT DOCUMENTS

2016/0267888 A1* 9/2016 Fukazawa ............ H04N 19/427
2017/0078682 A1* 3/2017 Matsui ................ H04N 19/172

* cited by examiner

*Primary Examiner* — Duy M Dang
(74) *Attorney, Agent, or Firm* — BCF LLP

(57) ABSTRACT

Provided are image management method, chip, image transmission method and electronic device. The image management method includes assigning an address particle for an image block in response to a writing of the image block, wherein each of the address particles is corresponding to different memory region in a memory respectively; storing the image block into the memory region corresponding to the address particle; and if the memory region corresponding to the address particle is full with data of the image block, writing an address of the memory region corresponding to the address particle into a preset information buffer, wherein the information buffer is configured to provide an acquirer of the image block with the address of the memory region corresponding to the address particle; and the acquirer is configured to acquire the image block from the memory based on the address of memory region corresponding to the address particle.

17 Claims, 6 Drawing Sheets

(58) Field of Classification Search
CPC .. G06F 12/0802; G06F 11/073; G06F 3/0643; G06T 1/60; G06T 2201/00; G06T 1/20; G06T 3/4015
USPC .......................................... 711/154, 156, 200
See application file for complete search history.

IMAGE MANAGEMENT METHOD, CHIP, IMAGE TRANSMISSION METHOD AND ELECTRONIC DEVICE

The present disclosure is a National Stage of International Application No. PCT/CN2023/120710 filed on Sep. 22, 2023, entitled “IMAGE MANAGEMENT METHOD, CHIP, IMAGE TRANSMISSION METHOD AND ELECTRONIC DEVICE”.

TECHNICAL FIELD

The present disclosure relates to the field of image transmission, and specifically to an image management method, chip, image transmission method and electronic device.

BACKGROUND ART

Compressing an image data during the process of the image transmission may improve the efficiency of the image transmission. When compressing the image, it is usually to converse the image data into an image block, and the image blocks wait to be read out after arranged according to a linear order.

When the image block is arranged according to the linear order, a larger storage space is required for temporarily storing the image block. Currently, a register is used to temporarily store the image block. When an image width of the image block that needs to be stored is larger, or the number of lines of the image block is larger, a storage space of the image block needed increases, and the number of registers needed will be larger. An excess of registers will occupy a larger chip area, which affects a subsequent circuit design and routing, and when multi-line image blocks are written at the same time, additional storage space needs to be provided to store address of data of each line, which further increases the area of the registers.

SUMMARY

The present disclosure is to provide an image management method, chip, image transmission method and electronic device, so as to reduce the chip area required by the circuit for temporarily storing the image blocks during a process of image data transmission.

In a first aspect, embodiments of the present disclosure provide an image management method, which includes: assigning the address particle for the image block in response to a writing of the image block, wherein each of the address particles is corresponding to a different memory region in the memory respectively, and the address particle is data recording the address of the corresponding memory region; and the memory includes a plurality of memory regions of first preset size; storing the image block into a memory region corresponding to the address particle; and if the memory region corresponding to the address particle is full with the data of the image block, writing the address of the memory region corresponding to the address particle into a preset information buffer, wherein the information buffer is configured to provide an acquirer of the image block with the address of the memory region corresponding to the address particle; and the acquirer is configured to acquire the image block from the memory based on the address of the memory region corresponding to the address particle.

Compared with the register, the memory needs a smaller chip area when storing the image blocks of same amount of data. In the embodiments of the present disclosure, utilizing the memory to store the image block may reduce the chip area occupied by the circuit for temporarily storing the image block during image transmission. The memory may be directly controlled by a processor, and compared with the register, the memory may store a larger amount of data, which needs to be controlled by reading and writing instructions. If the image blocks stored in the memory are not recorded, situations such as covering or repeated reading may occur. Therefore, in the embodiments of the present disclosure, it may use the address particle to record a storage and reading out of the image block. If the address of the memory region corresponding to the address particle is in the preset information buffer, it characterizes that the image blocks stored in the memory region may be read, and the image blocks corresponding to the address particles may not be covered by a new data. Therefore, when multi-line image blocks are written continuously or simultaneously in a short time, utilizing the address particles can make the image block accurately output, which reduces a possibility of data loss. Therefore, through the address particle and the memory, it may realize a normal storage, management and output of image blocks, as well as reduce the occupation to the chip area.

In an embodiment, before assigning the address particle for the image block, the method further includes: determining a configuration parameter of the memory according to a preset conversion format, wherein the configuration parameter is used to configure the memory; the preset conversion format is a preset compression format of the image block, and the preset conversion format includes a maximum image width of the image block and an arrangement of Y-component and UV-component of a pixel point in the image block; the Y-component is a brightness of the pixel point, and the UV-component is a chromaticity of the pixel point; the configuration parameter of the memory includes a number, a width, and a depth of the memory units in the memory; and the memory is composed of multiple pieces of memory units, and a total storage space the multiple pieces of memory units is divided into the plurality of memory regions.

During the image transmission, the format of the image block obtained from image data conversion may be predetermined, and in embodiments of the present disclosure, the configuration parameter of the memory may be determined according to the format of the image block. Therefore, it is possible to realize the image transmission by using a smaller storage space of the memory under the premise of enabling a configured memory to meet a requirement of the current image transmission, so as to reasonably utilize the storage resources, and make resources of the memory applied to other scenarios, which reduces a waste of resources.

In an embodiment, after determining the configuration parameter of the memory according to the preset conversion format, the method further includes: providing the number of the address particles and the first preset size based on the configuration parameters of the memory and the preset conversion format.

In embodiments of the present disclosure, the number of address particles and the first preset size may be dynamically configured according to the configuration parameters of the memory and the preset conversion format, so as to make the number of address particles and the first preset size matched with the image block format and the memory configuration during the current image transmission process, thereby alleviating a situation of the storage space waste caused by that the first preset size does not match with the image block format, and improving an utilization rate of the memory region of the memory, so as to reduce the chip area occupied by the memory.

In an embodiment, the information buffer includes a plurality of information memories corresponding to the Y-component and a plurality of information memories corresponding to the UV-component, wherein writing the address of the memory region corresponding to the address particle into the preset information buffer includes: writing the address corresponding to the memory region into the information buffer corresponding to the component type according to the component type of the pixel point written into the memory region, wherein the component type of the pixel point includes the Y-component and the UV-component.

The embodiment of the present disclosure utilizes different memory regions to store different pixel point components individually, and utilizes different information memories to store addresses of the memory region corresponding to different pixel point components individually, so that the address of Y-component and UV-component corresponding to the memory is separately acquired from the information buffer, and then the corresponding Y-component or UV-component is acquired from the memory region corresponding to the memory based on the address. Storing the Y-component and the UV-component separately may be easy to accurately distinguish the Y-component and the UV-component to obtain the required component type, which reduces a difficulty to manage the image blocks and reduces the possibility of confusion.

In an embodiment, after writing the particle information of the address particle into the preset information buffer, the method further includes: providing the acquirer with the address of the memory region corresponding to the address particle through the information buffer, so that the acquirer reads the image blocks from the memory region based on the address of the memory region corresponding to the address particle; and releasing the address particle corresponding to the memory region in response to the reading out of the image blocks in the memory region, wherein the released address particles characterize that the memory region corresponding to the address particle is allowed to be written a new image block.

In embodiments of the present disclosure, after the image blocks in the memory region are read out, the address particles corresponding to the memory regions are released. Therefore, the address particle can be reassigned to newly written image blocks to store the newly written image blocks into the memory region. Through storing address particles into the information buffer and releasing the address particles, it realizes the management of the addresses of the image blocks, and reduces a loss of image blocks due to being covered by new image blocks, so as to improve the accuracy of image transmission. At the same time, the address particles occupy a smaller space, so that the smaller chip area may be used to realize the management for the addresses of the image blocks.

In an embodiment, the image block includes the UV-component, wherein the UV-component is the chromaticity of the pixel point; multiple information memories are provided; and before releasing the address particle, the method further includes: if determining whether or not the UV-component read out needs to be reused based on the initial format when the image block is written in and the target format when the image block is written out, the address of the memory region corresponding to the address particle is rewritten into the next information buffer.

The transmission process of the image block may involve compression and the conversion of the image block format, so that the initial format is different from the target format, and the compression and conversion mainly involve UV-component. Therefore, restoring the image blocks or converting the image blocks to the target format needs to reuse the UV-component. In embodiments of the present disclosure, if the UV-component needs to be reused, the address of the memory region corresponding to the address particle is rewritten into the next information buffer. Therefore, the same UV-component does not need to store twice in the memory due to reuse, but only needs to write the address into the next information buffer, and to read the address again by using the next information buffer. Compared with the memory for storing image blocks, the information buffer for storing addresses occupies a smaller chip area, which reduces the problem of an excessive chip area due to the reuse of UV-component.

In an embodiment, the written image blocks includes a plurality of image blocks, and before assigning the address particles for image blocks, the method further includes: shifting the plurality of input image blocks and stitching them as an image block of second preset size; accordingly, after providing the acquirer with the address of the memory region corresponding to the address particle through the information buffer, the method further includes: shifting the image blocks in the memory region corresponding to the address particle to restore an arrangement order of the image blocks to an order when input.

In embodiments of the present disclosure, shifting and stitching the plurality of image blocks may unify the size of input image blocks, so that the image blocks of different sizes may be written in at the same size, so as to meet the use requirements of different scenarios, and expand a scope of use, and at the same time, it lowers the management difficulty of image blocks of different sizes, and reduces the use of circuits that manages the image blocks of different sizes, thereby reducing the occupied chip area.

In a second aspect, the embodiments of the present disclosure provide an image management chip, which includes: the memory, including a plurality of memory regions of the first preset size; the address resource pool, storing multiple address particles, wherein the different address particles are corresponding to the different memory regions; and the address particles are the data recording the addresses of the corresponding memory regions; the writing memory module, connected to the address resource pool and the memory; and a plurality of information memories, each of the information memories being connected to the writing memory module, wherein the writing memory module is configured to receive the written image blocks; the address resource pool is configured to allocate the address particles for the image blocks in response to the writing of the image blocks; the writing memory module is further configured to store the image blocks into the memory region corresponding to the address particle; the writing memory module is further configured to write the address of the memory region corresponding to the address particle into the information buffer if the memory region corresponding to the address particle is full with data of the image blocks; the information buffer is configured to provide the acquirer of the image blocks with the address of the memory region corresponding to the address particle; and the acquirer is configured to acquire the image blocks from the memory based on the address of the memory region corresponding to the address particle.

In an embodiment, the memory is configured to determine configuration parameters of the memory based on the preset conversion format, wherein the configuration parameters are used to configure the memory; the preset conversion format is the compression format of the preset image block, and the preset conversion format includes the maximum image width of the image block and the arrangements of the Y-component and the UV-component of the pixel points of the image block; the Y-component is the brightness of the pixel points, and the UV-component is the chromaticity of the pixel points; the configuration parameter of the memory includes the number, the width and the depth of the memory units in the memory; and the memory is composed of the multiple pieces of memory units, and the total storage space of the multiple pieces of memory units is divided into the plurality of memory regions.

In an embodiment, the memory is further configured to provide the number of address particles and the first preset size based on the configuration parameters of the memory and the preset conversion format.

In an embodiment, the plurality of information memories include the plurality of information memories corresponding to the Y-component and the plurality of information memories corresponding to the UV-component; and the writing memory module is further configured to include: writing the address corresponding to the memory region into the information buffer corresponding to the component type according to the component type of the pixel point written into the memory region, wherein the component type of the pixel point includes the Y-component and the UV-component.

In an embodiment, the image management device further includes: the reading memory module, configured to be connected to the memory, the address resource pool, and the information buffer respectively, wherein the reading memory module is configured to be the acquirer; the reading memory module is further configured to acquire the address of the memory region corresponding to the address particle stored in the information buffer, and to read the image blocks in the memory region corresponding to the address particle from the memory and output based on the address of the memory region corresponding to the address particle; and the reading memory module is further configured to release the address particles corresponding to the memory region in response to the reading out of the image blocks in the memory region, wherein the released address particle characterizes that the memory region corresponding to the address particle is allowed to write in the new image block.

In an embodiment, the image block includes the UV-component, and the UV-component is the chromaticity of the pixel points; and the memory is further configured such that, if whether or not the UV-component read out needs to be reused is determined based on the initial format when the image block is written in and the target format when the image block is written out, the address of the memory region corresponding to the address particle is rewritten into the next information buffer.

In an embodiment, the image management chip further includes: the input data shifting module, configured to be connected to the writing memory module for receiving the written image blocks, and shifting the plurality of input image blocks and stitching them as the image block of second preset size; and the output data shifting module, connected to the reading memory module for shifting the image blocks output from the reading memory module, so to restore the pixel of the image block to the order when input.

In a third aspect, an image transmission method provided by embodiments of the present disclosure includes: after the first device compressing the image data into image block, storing the image block based on the image management chip according to any one of the second aspect; and the second device sending a reading instruction to the image management chip to read the image block from the image management chip.

In a fourth aspect, the embodiments of the present disclosure provide an electronic device, which includes: the image management chip according to any one of the second aspect.

In the embodiments of the present disclosure, utilizing the memory to store the image block may reduce the chip area occupied by the circuit for temporarily storing the image block during image transmission. By using the address particles to record the storage and reading out of image blocks, when multi-line image blocks are written continuously or simultaneously in the short time, it may use the address particles to make the image block accurately output, which reduces a possibility of data loss. Therefore, through the address particle and the memory, it may realize a normal storage, management and output of image blocks, as well as reduce the occupation to the chip area.

BRIEF DESCRIPTION OF DRAWINGS

In order to more clearly illustrate the technical solution of the embodiments of the present disclosure, the drawings to be used in the embodiments of the present disclosure will be briefly introduced below. It should be understood that the following drawings only show certain embodiments of the present disclosure, and therefore should not be regarded as a limitation of the scope, and for those ordinary skilled in the field, other relevant drawings may be obtained based on these drawings without creative labors.

Figure 1:
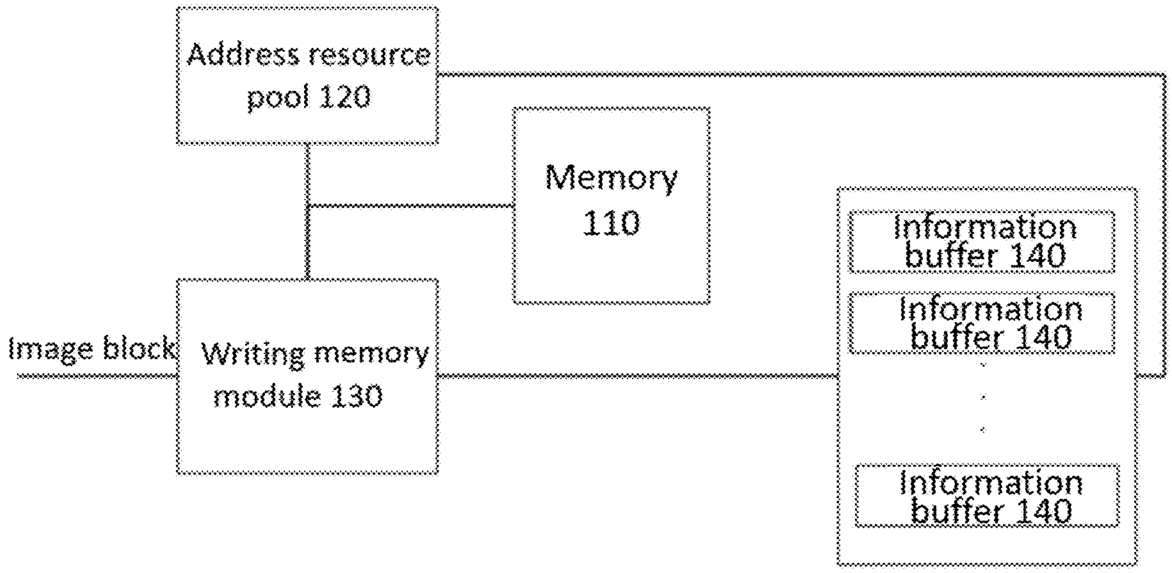
FIG. 1 shows a schematic diagram of the image management chip provided by the embodiment of the present disclosure.

Reference numbers: image management chip 100; memory 110; address resource pool 120; writing memory module 130; information buffer 140; reading memory module 150; input data shifting module 160; output data shifting module 170; first device 310; second device 320.

DETAILED DESCRIPTION OF EMBODIMENTS

In order to make the purpose, technical solutions and advantages of the embodiments of the present disclosure more clearly, the present disclosure is further described in details in conjunction with the drawings and the embodiments. It should be understood that the specific embodiments described herein are intended only to explain the present disclosure and are not intended to limit the present disclosure.

Referring to FIG. 1, and FIG. 1 shows a schematic diagram of the image management chip provided by an embodiment of the present disclosure. The image management chip includes: the memory 110, the address resource pool 120, the writing memory module 130 and the information buffer 140.

The memory 110 includes multiple pieces of memory units, wherein the memory unit may be SRAM (single port Static Random-Access Buffer), but it is not a limitation.

In the embodiment, the storage space of the memory 110 is a sum of the storage spaces of the multiple pieces of memory units. The storage space of the memory 110 may be divided into a plurality of memory regions of the first preset size according to the demand, in order to store the different image blocks in different memory regions respectively, wherein the first preset size in each memory regions is the same.

The memory 110 further includes a memory controller, wherein the memory controller is separately connected to the writing memory module 130, the address resource pool 120 and each of the memory units to control various portions in the image management chip to realize functions of the image management method provided by the present disclosure.

The address resource pool 120 is connected to the memory 110, wherein the address resource pool 120 stores the plurality of address particles, and different address particles correspond to different memory regions.

In the embodiment, the address resource pool 120 may include a buffer, wherein a storage space of the buffer may be divided into different regions with same size, the address of one memory region in the buffer 110 is stored in one of multiple regions, and the address particle includes the address of the memory region and the corresponding region in the buffer.

The writing memory module 130 is connected to the address resource pool 120 and the memory 110.

In the embodiment, the writing memory module 130 includes the buffer, so that the writing memory module 130 may receive and temporarily store the written image blocks.

The plurality of information memories 140 are all connected to the writing memory module 130, wherein the information buffer 140 may be the register, a FIFO (First In First Out), etc., which is configured to store the address of the memory region corresponding to the address particle.

The data of the image block includes different types of pixel point components, for example, the image blocks are compressed into a YUV (a color coding method) format during the image transmission. The image block of the YUV format includes a Y-component, a U component and a V component, wherein the Y denotes the brightness, the U and V denote the chromaticity (or color saturation). In the embodiment, the Y-component and UV-component of the image block may be stored in different memorys 110, and accordingly, the different information memories 140 may be configured to store the addresses of the memory regions of the different components respectively.

In embodiments of the present disclosure, after the writing memory module 130 received the written image blocks, the address resource pool 120 may allocate the address particles for the written image block, and then send the address particle to the writing memory module 130. The writing memory module 130 is further configured to store the image blocks into the memory region corresponding to the address particles.

In embodiments of the present disclosure, when the memory region corresponding to the address particle is full with the data of image blocks, the address of the memory region corresponding to the address particle may be stored into the information buffer 140, which may indicate that the image block can be read. At the same time, when the address of the memory region corresponding to the address particle has been stored in the information buffer 140, the address particle will not to be allocated again, so as to avoid that the unread image block is covered by the newly written image block, and to reduce the possibility of data loss.

Accordingly, the address of the memory region corresponding to the address particle is written into the information buffer 140; and the information buffer 140 is configured to provide the acquirer of the image blocks with the address of the memory region corresponding to the address particle.

The acquirer may be the receiver during the image transmission process, wherein the acquirer is configured to be connected to the information buffer 140, the memory 110 and the address resource pool 120, and the acquirer may acquire the image blocks from the memory 110 based on the address of the memory region corresponding to the address particle provided by the information buffer 140. After acquiring the image blocks of the memory 110, the address particles may also be released into the address resource pool 120 from the acquirer so that the address particle may be assigned to the newly written image block, and thereby the memory region corresponding to the address particle may be covered by the newly written image block.

Figure 2:
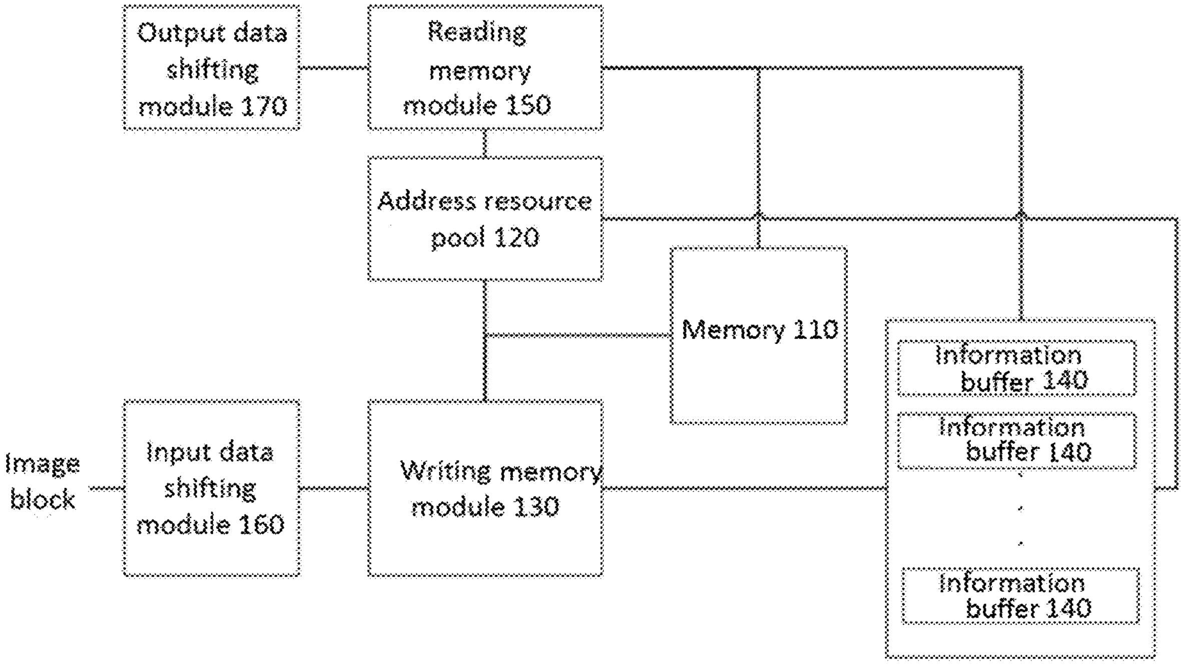
FIG. 2 shows an expansion schematic diagram of the image management chip provided by the embodiment of the present disclosure.

Referring to FIG. 2, wherein the FIG. 2 shows the expansion schematic diagram of the image management chip provided by an embodiment of the present disclosure.

In an embodiment, the image management chip may further include: the reading memory module 150. The reading memory module 150 is configured to be separately connected to the memory 110, the address resource pool 120 and information buffer.

In the embodiment, the reading memory module 150 is configured to be the acquirer, wherein the receiver in the image transmission process is connected to the reading memory module 150. The receiver in the image transmission process may send instructions to the reading memory module 150, so that the reading memory module 150 acquires the address of the memory region corresponding to the address particle stored in the information buffer 140, and the reading memory module 150 reads out the image blocks in the memory region corresponding to the address particle from the memory 110 based on the address of the memory region corresponding to the address particle and output the image blocks.

Similar to the writing memory module 130, the reading memory module 150 may include the buffer to temporary store the image blocks read out from the memory 110.

Accordingly, the reading memory module 150 is further configured to release the address particles corresponding to the memory region in response to the reading out of the image blocks in the memory region, so that the new image blocks may be stored in the memory region corresponding to the address particle.

In an embodiment, the image management chip further includes: the input data shifting module 160, configured to be connected to the writing memory module 130 to receive the written image blocks, and to shift and stitch the plurality of input image blocks as the image block of second preset size.

Figure 3:
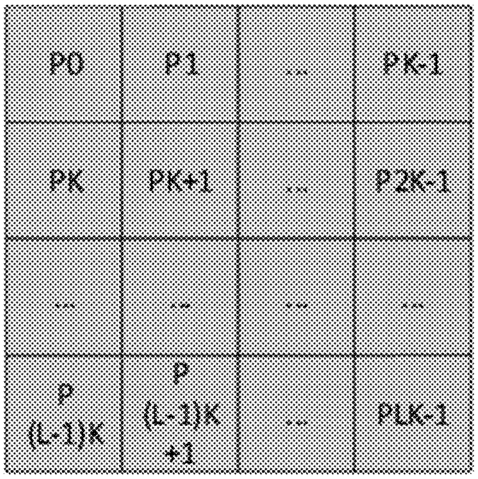
FIG. 3 shows a schematic diagram of an image block provided by the embodiment of the present disclosure.
Figure 4:
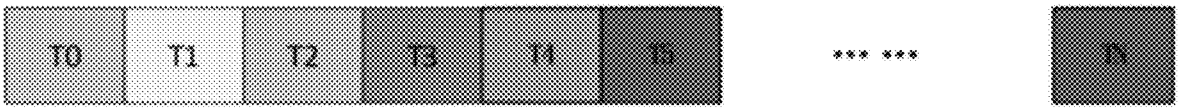
FIG. 4 shows a schematic diagram of a line of image blocks provided by the embodiment of the present disclosure.

Referring to FIG. 3 and FIG. 4, wherein P denotes the pixel points and T denotes the image blocks. As shown in FIG. 3, a plurality of lines (rows) of image blocks are included, such as L lines shown in FIG. 3, and each line may include multiple pixel points, such as K pixel points shown in FIG. 3, which makes lengths and widths of different image blocks different. A line of the plurality of image blocks arranged as shown in FIG. 4 are needed in the process of the image transmission, so that lengths and widths of each image blocks in a line are required to be matched.

During the image transmission, the compressed and converted formats of the image blocks may be different, for example, the different components may be transmitted, such as the Y-component and the UV-component, wherein the Y-component may be 16×8 and U component may be 8×4. The different frames of the images may be transmitted, for example, the image block of a certain frame may be 16×8 and the image block of the other frame may be 8×4, which all makes the image block formats different. In the embodiment, by providing the input data shifting module 160, the input data shifting module 160 may receive the image blocks, and shift and stitch the plurality of input image blocks as the image block of second preset size, so that the image blocks input into the memory 110 are the image blocks with a uniform size.

Accordingly, the image management chip further includes the output data shifting module 170, which is configured to be connected to the reading memory module 150 to shift the image blocks output from the reading memory module 150, so that the pixel points of the image blocks may be restored as the order when input.

Through the shifting and stitching of the image blocks, the image management chip may temporarily store the image blocks of different types, so as to meet requirements for temporarily storing in different image transmission scenarios.

Based on the same inventive concept, the embodiments of the present disclosure further provide an image management method, which is applied to the image management chip of any one of the embodiments foregoing, wherein the image management chip is separately connected to a sender and a receiver of the image transmission.

Figure 5:
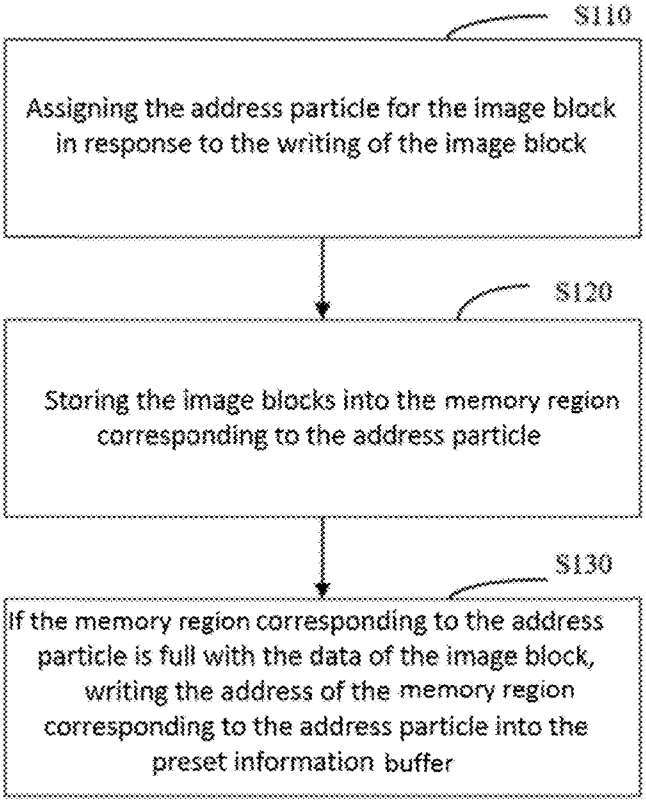
FIG. 5 shows a flowchart diagram of the image management method provided by the embodiment of the present disclosure.

Next, the contents of the above image management chip will be expanded in conjunction with the image management method. Referring to FIG. 5, FIG. 5 shows the flowchart diagram of an image management method provided by an embodiment of the present disclosure, wherein the image management method includes the following steps.

S110, assigning the address particle for the image block in response to the writing of the image block.

In the embodiment, after the image data is compressed as the image blocks by the sender of the image transmission, the image block may be sent to the image management chip, wherein the writing memory module 130 in the image management chip may receive the image block, and the address resource pool 120 allocates the address particles for the image block in response to the writing of the image block in the writing memory module 130.

In an embodiment, before assigning the address particles for the image block, the plurality of input image blocks may also be shifted and stitched as the image block of second preset size.

If the image management chip is needed to support the plurality of image blocks to write in simultaneously, and the written image blocks may be different formats, in the embodiment, the input data shifting module 160 of the image management chip may be used to shift and stitch the written image blocks, so that the plurality of image blocks is shifted and stitched as one or one line of the image blocks of second preset size. Therefore, the writing memory module 130 and the memory may store and manage the image blocks of a uniform format to realize a temporary storage management of simultaneous writing in of the plurality of image blocks.

In an embodiment of the present disclosure, each of the address particles corresponds to the different memory regions in the memory 110, wherein the address particles are the data recording the addresses of the corresponding memory regions, and the memory 110 includes a plurality of memory regions of the first preset size.

During the image transmission, the image block format after the image data are compressed may be different, accordingly, the first preset size of the memory region may be different, and besides storing the image blocks, the memory 110 may also store data for the other module works. Therefore, when storing the image blocks temporarily, it is necessary to select a memory 110, which realizes the function of temporary storage for the image block, and also has a less storage space.

In the embodiment, the memory 110 may be dynamically configured, i.e., a larger memory 110 is provided, wherein the memory 110 includes multiple pieces of memory units, and the width and depth of the memory units can be configured as required. As a result, when performing the image transmission, the memory 110 including a memory unit of demanded size is taken for temporary storage of the image blocks.

Accordingly, when dynamically configuring the memory 110, the configuration parameters of the memory 110 need to be determined firstly. In the embodiments of the present disclosure, before assigning the address particles to the image block, the memory controller may be configured to determine configuration parameters for the memory 110 according to the preset conversion format, so as to configure the memory 110 based on the configuration parameters.

In the embodiment, the preset conversion format is the compression format of the preset image block, i.e., the format when the image data is compressed into the image block during the image transmission, which may be acquired directly and will not be expanded herein.

Figure 6:
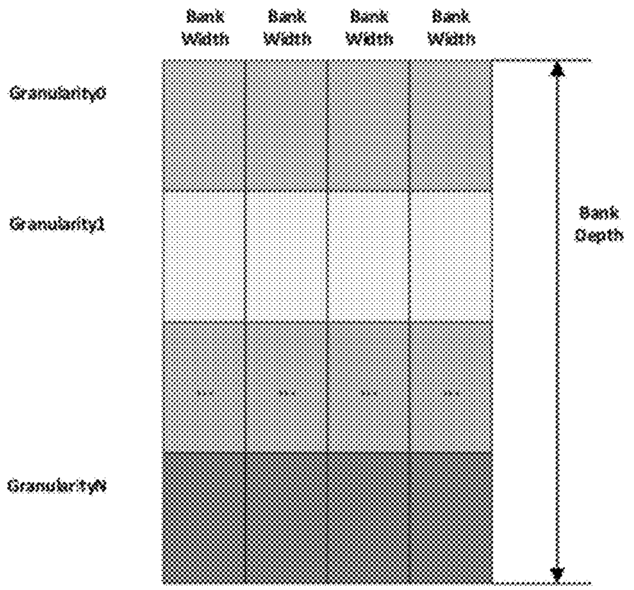
FIG. 6 shows a schematic diagram of the memory unit provided by the embodiment of the present disclosure.

The configuration parameters of the memory 110 include number, width and depth of the memory units in the memory 110. Referring to FIG. 6, FIG. 6 shows a schematic diagram of the memory unit provided by an embodiment of the present disclosure, wherein Bank Width denotes the width of the memory unit, Bank Depth denotes the depth of the memory unit, and Granularity0 to GranularityN denote different address particles, i.e., one memory unit may correspond to the plurality of address particles.

In the embodiment, one memory unit is allowed to be written in one line of data at a same time, so that the plurality of memory units may be provided in the memory to allow different data to be written in at the same time, and each of the memory unit reads and writes at least one line of data of the image block once, i.e., stores at least the data corresponding to one address particle. The depth of the memory unit may be provided according to the size of the data to be stored. In embodiments of the present disclosure, the number of memory units may be the width of the input image blocks (i.e., the second preset size) divided by the width of the memory units, wherein the width of one piece of memory unit is equal to a lesser one of the size of one line of Y-components and the size of one line of UV in the image block, and a depth of one piece of memory unit is the size of the storage space of the memory 110 divided by the width of the memory 110 and then divided by the number of memory 110.

Additionally, if the image blocks written include image blocks of different formats, the configuration parameters may be determined in a uniform format, by shifting and stitching the image blocks into a uniform format. That is, the preset conversion format may also be a second preset size of the input shifting stitching module.

Figure 7:
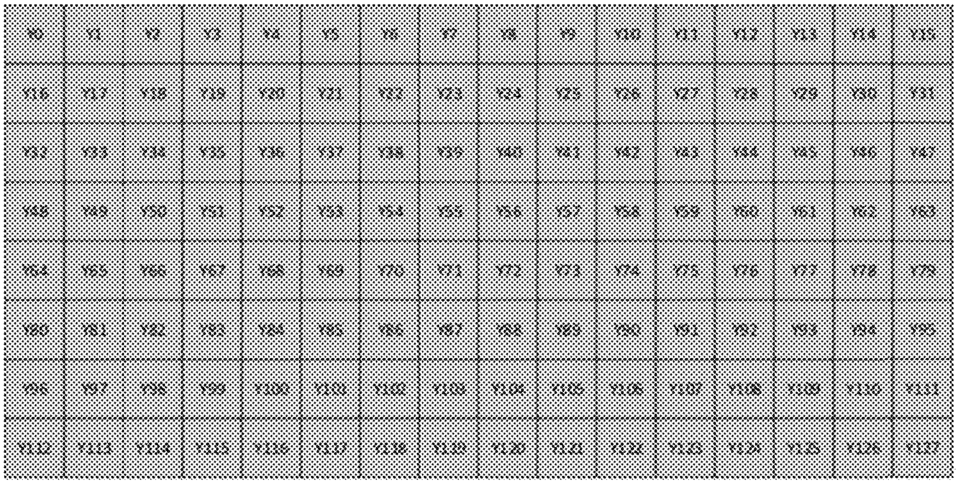
FIG. 7 shows a schematic diagram of the Y-component provided by the embodiment of the present disclosure.
Figure 8:
FIG. 8 shows a schematic diagram of the UV-component provided by the embodiment of the present disclosure.

The preset conversion format includes the maximum image width of the image block, and the arrangement of the Y-component and UV-component of the pixel points in the image block. For example, the maximum image width of an image block may be 4096 Pixel (the pixel point). Taking an example of NV12 (an image format), as shown in FIG. 7, the Y-component is arranged as 16×8, i.e., 8 lines in total and 16Y in each line, and the size of each Y is 1 Bbyte and 16 Bbyte in each line. As shown in FIG. 8, the UV-component is arranged as 8×4, 4 lines in total and 8UV in each line, with 2 Bbyte for each UV and 16 Bbyte for each line, wherein the Y-component and UV-component refer to the Y-component and UV-component of the pixel point, a pixel point includes the Y-component and the UV-component, an image block is consisted of more than one pixel points, and the UV-component may be a compressed component.

When the image data is transmitted, the image blocks are arranged in a linear manner, and the memory 110 stores at least 1 line of image blocks once if one line of image blocks is transmitted once. Therefore, corresponding to the above NV12 format, the size of the storage space required to store the Y-component is 4096*1*8=32 Kbyte, wherein the maximum image width of the Y-component is 4096, 1 is 1 Y-component, and 8 is the number of lines of the Y-component. The size of the storage space required to store the UV-component is 2048*2*4=16 Kbyte, wherein the number of one line of the UV-component is only 8, so that the width of the UV-component is a half of the Y-component, i.e., 2048, and the NV12 is a compression of YUV420, so the width of the UV-component is a half of the Y-component. The UV-component includes a U component and a V component, so that the size of each UV-component is 2. Meanwhile, the number of lines of the UV-component of a single image block is 4, so that the calculated size of the needed memory 110 is 48 Kbyte.

The width size of a piece of memory unit is the number of the byte in 1 line of the image blocks (the width of image blocks), and the smallest width of image block is selected if multiple types of image blocks are to be supported. For example, in the above example, the required widths of a line of Y-components or a line of UV-components are the same, which are both 16 byte, so that the width size of the memory unit is 16 byte, and if they are different, the smaller one is selected to be configured as the width size of the memory unit. As another example, if the width of input image blocks to be required is 64 byte, the width of the plurality of image blocks is 64 byte when stitched, and then the stitched image blocks are input, wherein the number of memory units needed is 64/16=4 pieces. Correspondingly, each of the memory units has a depth of 48*1024/16/4=768, i.e., the memory 110 includes 4 pieces of memory units with a width of 16 byte and a depth of 768.

Figure 9:
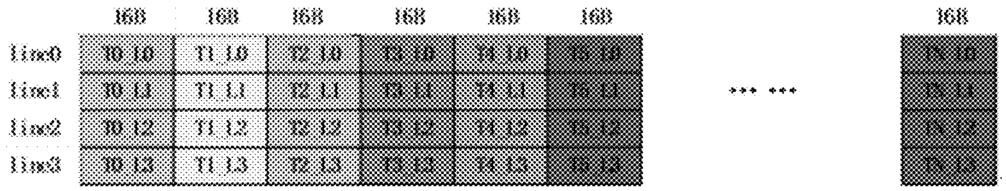
FIG. 9 shows a schematic diagram of the multi-line image blocks provided by the embodiment of the present disclosure.

In some scenarios, the image blocks are transmitted in form of lines, as shown in FIG. 9, line0 to line3 represent different lines of image blocks, each line includes N image blocks respectively, and the image blocks in different lines are needed to be transmitted and stored in different memory units respectively. The size of a line of image blocks in single transmission may be larger than the first preset size, and therefore, in some embodiments of the present disclosure, the address particles where a line of image blocks is assigned may be multiple. However, if the data of the image blocks stored in the memory region corresponding to the address particle are smaller, it will cause a waste of the storage resources of the memory region. For example, if the size of a line of image blocks is 120 Kbyte, and the data size that can be stored in each memory region is 50 Kbyte, the line of image blocks needs to be assigned with 3 address particles and corresponding memory regions, and the third memory region only stores 20 Kbyte, which causes a waste of storage space of 30 Kbyte.

For the above reasons, it is necessary to reasonably provide the number of address particles and the first preset size of the corresponding memory region. In some embodiments of the present disclosure, the memory controller may be configured to provide the number of address particles and the first preset size based on the configuration parameters and the preset conversion formats of the memory 110.

Exemplarily, the number of address particles and the first preset size may be determined according to the arrangements of the Y-component and the UV-component in the preset conversion format and the maximum image width. If the maximum image width of the image blocks is 4096 Pixel, taking NV12 as an example, the Y-component is 16×8 and the UV-component is 8×4, the width of the Y-component and the UV-component is 16 Kbyte, and the first preset size may be 1 Kbyte. Accordingly, the size of the total storage space of the memory 110 is 48 Kbyte, then it may be divided into 48 memory regions and provides 48 address particles.

The maximum image width should be multiples of the first preset size. For example, if the image width is 768 and the first preset size provided is 1 Kbyte, storing a line of the image blocks will cause a waste of the space of 1024−768=256 Byte each time; and if the first preset size provided is 64 byte, that is, 768 is multiples of 64, it will not cause a waste.

Accordingly, the number of information memories 140 may also be determined according to the preset conversion format, wherein the number of the information storage of the first preset size is equal to the number of lines of each component in the image blocks. For example, in the NV12 format, if there are 8 lines of Y-component and 4 lines of UV-component, 8 information memories 140 are needed to store the address of a memory region, wherein Y-component of each line of image blocks is stored in the memory region, and 4 information memories 140 are needed to store the address of a memory region, wherein UV-component of each line of image blocks is stored in the memory region.

Next, the size of the storage space of the information buffer 140 may also be configured according to the size of the address of the memory region corresponding to the address particles and the number of the address particles. Since the address of the memory region corresponding to the address particles may not be read out in time, the information buffer 140 may have a plurality of address. For example, Y-component needs 8 information memories 140, the first information buffer 140 needs to store the address of the Y-component of the 0th line in the image blocks, and store 8th/16th/24th lines of Y-component of the image blocks, etc. The second information buffer 140 stores the address of the Y-component of the 1st line in the image blocks, which is corresponding to 9th/17th/25th lines of the Y-component, etc., and so forth. The address in the prior information memories 140 is read out more quickly, e.g., the first information buffer 140 may only need to store 4 addresses, the second and the third information memories 140 may need to store 5 addresses, the fourth and the sixth information memories 140 may need to store 6 addresses, and the seventh and the eighth information memories 140 may need to store 7 addresses. If the address size of a memory region is 6 bit, all information memories 140 storing the Y-component need a storage space of 6 bit*(4+5*2+6*3+7*2)=276 bit.

Similarly, storing the UV-components needs 4 information memories 140, and if the first one to the fourth one store 4, 5, 6 and 7 addresses respectively, all information memories 140 storing UV-components need a total storage space of 6*(4+5+6+7)=132 bits.

S120, storing the image blocks into the memory region corresponding to the address particle.

In the embodiment, different address particles are corresponding to different memory regions, and the address particles include addresses of corresponding memory regions, and then the image blocks may be stored into the memory region corresponding to the address of the memory region according to the address of the corresponding memory region in the address particles.

In the embodiments of the present disclosure, the memory is configured to allow the multi-line image blocks to be written.

Figure 10:
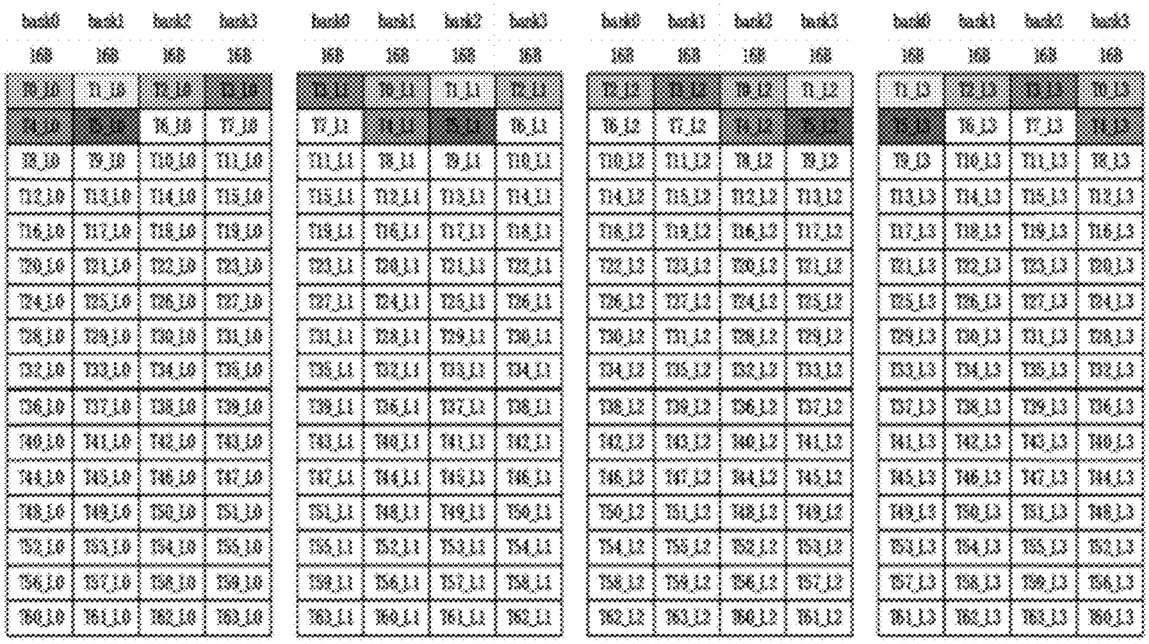
FIG. 10 shows a schematic diagram of writing the multi-line image blocks provided by the embodiment of the present disclosure.

Exemplarily, FIG. 10 shows a schematic diagram of the multi-line image blocks to be written provided by an embodiment of the present disclosure, wherein four tables respectively denote a record of different address particles being stored into the image blocks, bank0 to bank3 respectively denote different memory units, T0 to T60 respectively denote different lines of image blocks, and L0 to L3 denote different image blocks in the same line.

As shown in FIG. 10, if the plurality of address particles are assigned to one line of the image blocks, different image blocks in the one line of image blocks may be stored into the memory units corresponding to different address particles. For example, for the four image blocks L0 to L3 in a line of image blocks T0, a first address particle may be assigned to the first image block in image blocks of each line, a second address particle may be assigned to the second image block in image blocks of each line, and so on; and different images in the same line of image blocks are separately stored into different memory units through different address particles, and so on.

Specifically, for each image block of the first line of image block T0, the 1st image block (T0_L0) is placed at a position of bank0 in line 0, the 2nd image block (T0_L1) is placed at a position of bank1 in line 1, the 3rd image block (T0_L2) is placed at a position of bank2 in line 2, and the 4th image block (T0_L3) is placed at a position of bank3 in line 3.

In order to use all memory units of address particles in address of each line, i.e., in order to store the image block uniformly in each memory unit and to reasonably utilize the space of each memory unit, for the image blocks in T1 line, the 1st image block (T1_L0) is written to the position of bank1 of line 0, the 2nd image block (T1_L1) is written to the position of bank2 of line 1, the 3rd image block (T1_L2) is written to the position of bank3 of line 2, and the 4th image block (T1_L3) is written to the position of bank0 of line 3. By analogy, multiple image blocks are written in until the address memory particles of 1 Kbyte are used up.

S130, if the memory region corresponding to the address particle is full with the data of the image block, writing the address of the memory region corresponding to the address particle into the preset information buffer 140.

In the embodiment, when the memory region is full, the address of the memory region corresponding to the address particle may be written into the information buffer 140, so that the address of the memory region may be provided to the acquirer through the information buffer 140, and the acquirer may read the image block from the memory 110 according to the address.

If the plurality of address particles are assigned to the image block, after the current memory region corresponding to the address particle is full, the address of the memory region corresponding to the address particle is written into the information buffer 140, and the memory region corresponding to the next address particle continues to store the data of the image block.

In some embodiments, the image management method may further include S140, which provides the acquirer with the address of the memory region corresponding to the address particle through the information buffer 140.

In the embodiment, the acquirer may be the receiver during image transmission or the reading memory module 150. The reading memory module 150 may read the image block from the memory 110 according to the address in the information buffer 140, or the receiver may send the instruction to the reading memory module 150 to control the reading memory module 150 to read the image block from the memory 110 according to the address. The reading memory module 150 may output the image block after acquiring the image block.

Additionally, if the image blocks have been shifted and stitched before written into the memory 110, the image blocks in the memory region corresponding to the address particle are shifted when output, so that the arrangement order of the image blocks is restored to the order when input. The output data shifting module 170 may be used to shift the output image block.

After the image block is read out of the memory region, the reading memory module 150 releases the address particle corresponding to the memory region back into the address resource pool 120 in response to a reading out of the image block in the memory region. Therefore, the address resource pool 120 may reassign the address particle to the newly written image block, and the memory region corresponding to the address particle is also allowed to be covered, i.e., the released address particle characterizes that the memory region corresponding to the address particle is allowed to make the new image block written in.

The images are compressed during image transmission, and compression makes the format of the image blocks changed, and the image may involve the format conversion, i.e., the image data is converted from one format to another. The format change of the image block is mainly embodied as the change of UV-component, so that during the transmission, copying the UV-component may be used to restore or change the image format. For example, the Y-component and the UV-component in YUV420 are 2:1 in vertical direction, and the Y-component and the UV-component in YUV444 are 1:1. If the image is converted from YUV420 to YUV444, the UV-component in the vertical direction needs to be interpolated by the UV-components of neighboring upper and lower lines, i.e., the UV-component is needed to be reused once. The detailed principle of format conversion may refer to the prior art and will not be expanded herein.

In an embodiment of the present disclosure, before releasing the address particles, the image management method may further include: if it is determined whether or not the UV-component read out needs to be reused based on the initial format when the image block is written in and the target format when the image block is written out, rewriting the address of the memory region corresponding to the address particle into the next information buffer 140.

In the embodiment, if the UV-component is to be reused, it is stored in neighboring next information buffer 140, so that the acquirer acquires the address of the UV-component in the memory 110 from the next information buffer 140 to read the UV-component from the memory region and output again, so as to realize the repeated output of the UV-component, which is equivalent to output the UV-component after copying the UV-component once. Compared to direct copying and storing, the address is written into the information buffer 140, so that only the information buffer 140 needs to store the address and the memory 110 does not need to store two same UV-components, which reduces the amount of data required for storing the UV-component, and thus reduces the chip area occupied by the memory 110.

Figure 11:
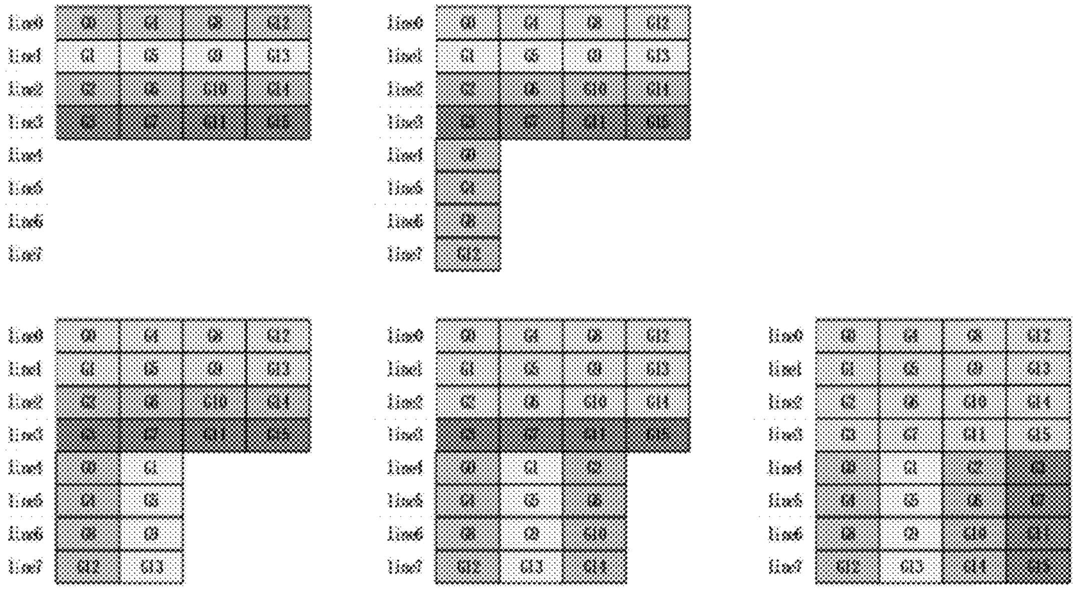
FIG. 11 shows a schematic diagram of redistributing the address particle in the first scene provided by the embodiment of the present disclosure.

Exemplarily, referring to FIG. 11, the FIG. 11 shows a schematic diagram of redistributing address particles in the first scene provided by an embodiment of the present disclosure. G0 to G15 are different address particles and line0 to line7 are different lines of image blocks. As shown in the first table of FIG. 11, different address particles are assigned to line0 to line3, and the address particles used for line0 are G0, G4, G8, and G12 respectively. When the image block of line0 is read out, the address particles need to be redistributed, and each address particle corresponding to line0 may be assigned to line4 to line7 to separately store the first image block of the image blocks in each line. Similarly, the address particles corresponding to line1 originally are G1, G5, G9 and G13, and when the image block in line1 is read out, the address particles will be redistributed, i.e., assigning to line4 to line7 to store the second image block of the image blocks of each line, and so on, so as to realize the reuse of each address particle.

Figure 12:
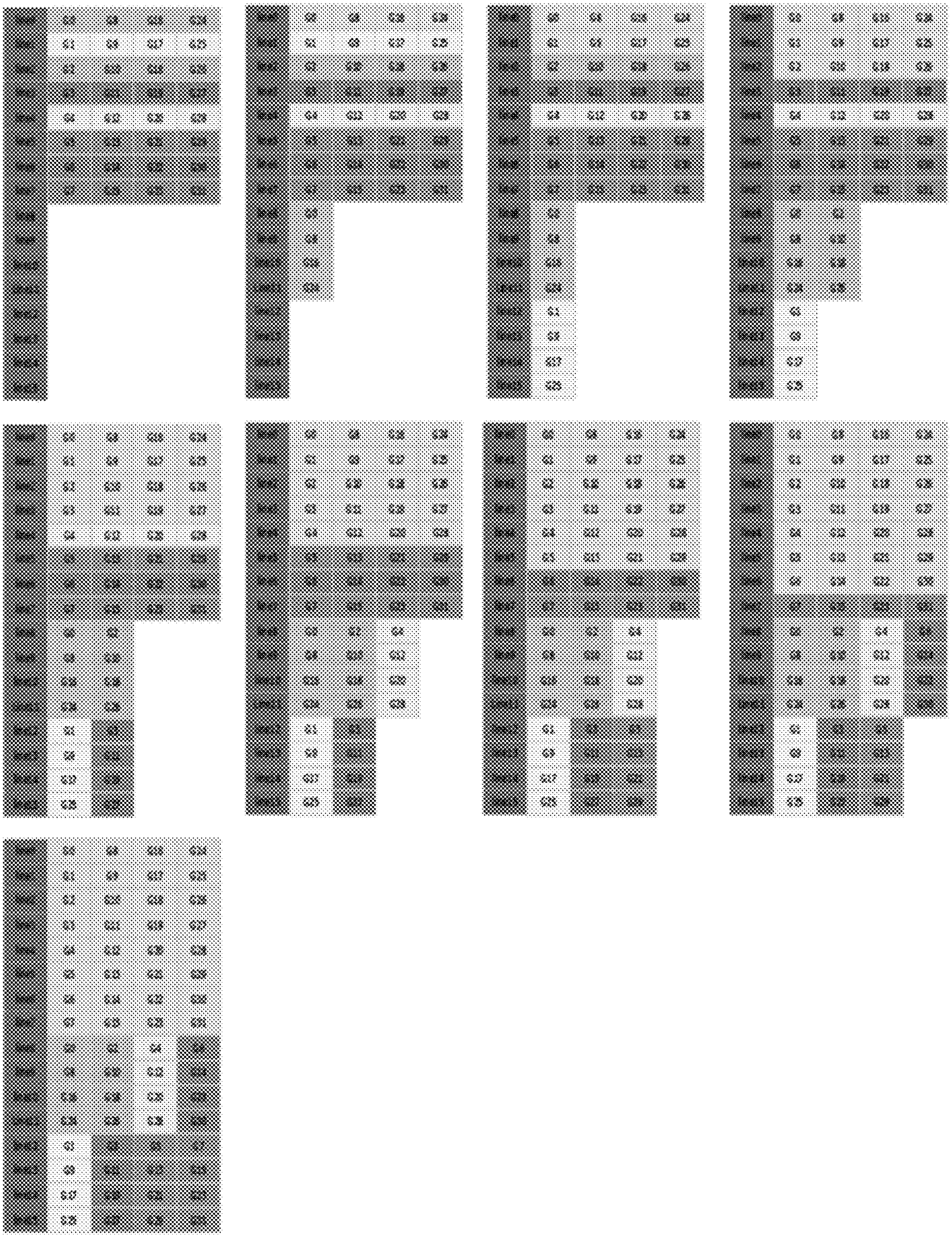
FIG. 12 shows a schematic diagram of redistributing the address particle in the second scene provided by the embodiment of the present disclosure.

Similarly, referring to FIG. 12, the FIG. 12 shows a schematic diagram of redistributing address particles in second scene provided by an embodiment of the present disclosure. G0 to G31 denote different address particles and line0 denotes different line image blocks. As shown in the first table of FIG. 12, different address particles are assigned to line0 to line7 and the address particles used for line0 are G0, G8, G16 and G24 respectively. As shown in the second table of FIG. 12, when the image block of line0 is read out, the address particles need to be redistributed, and each address particle corresponding to line0 may be assigned to line8 to line11 to separately store the first image block of the image blocks in each line. As shown in the third table of FIG. 12, the address particles corresponding to line1 originally are G1, G9, G17 and G25, when the image block of line1 is read out, the address particles will be redistributed, i.e., assigning to line12 to line15 to store the first image block of image blocks in each line. As shown in the fourth table of FIG. 12, the address particles G2, G10, G18, and G26 originally corresponding to line 2 are reassigned to line 8 to line11, and so on, so as to realize the reuse of each address particle.

In the embodiments of the present disclosure, compared with the register, the memory 110 needs a smaller chip area to store image blocks with the same amount of data, so that utilizing the memory 110 to store the image blocks may reduce the chip area occupied by the circuitry for temporarily storing the image blocks during the image transmission. The register may be directly controlled by the processor, compared with the register, the memory 110 may store a larger amount of data, which needs to be controlled by reading and writing instructions. If the image blocks stored in the memory 110 are not recorded, situation, such as covering and repeated reading may occur. Therefore, in the embodiments of the present disclosure, it may use the address particle to record the storage and reading out of the image blocks. If the address of the memory region corresponding to the address particle is in the preset information buffer 140, it characterizes that the image blocks stored in the memory region may be read, and the image blocks corresponding to the address particles may not be covered by the new data. Therefore, when multi-line image blocks are written continuously or simultaneously in a short time, it may use the address particles to make the image block accurately output, which reduces the possibility of data loss. Therefore, through the address particle and the memory 110, it may realize the normal storage, management and output of image blocks, as well as reduce the occupation to the chip area.

Figure 13:
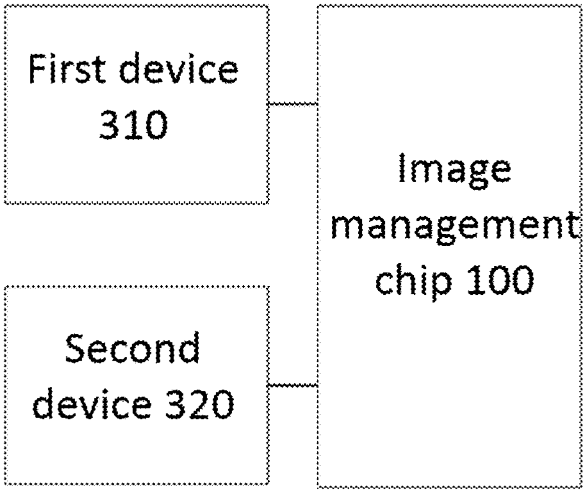
FIG. 13 shows a schematic diagram of the application scene of the image transmission method provided by the embodiment of the present disclosure.

Based on the same inventive concept, the embodiments of the present disclosure also provide an image transmission method. As shown in FIG. 13, the image transmission method may be applied in a scene including the first device 310, the second device 320 and the image management chip 100 provided by any of the above embodiments. The first device 310 and the second device 320 are the sender and receiver in the image transmission, respectively.

Figure 14:
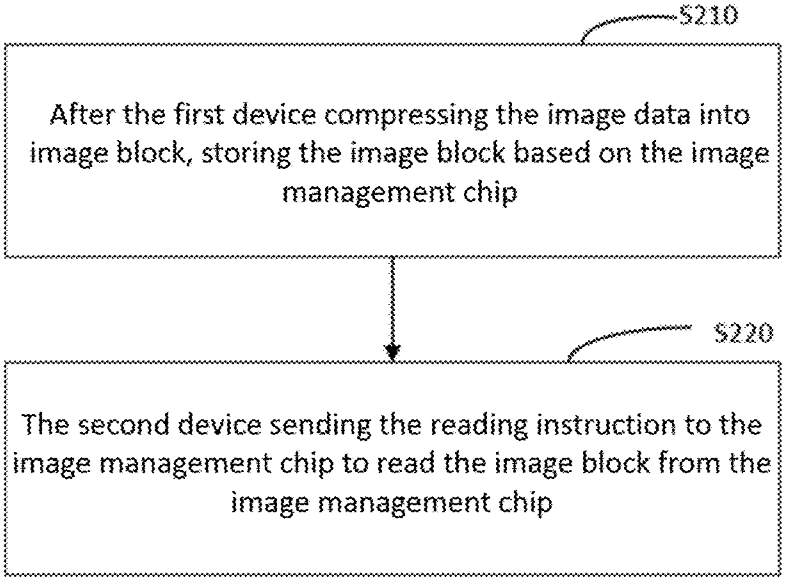
FIG. 14 shows a flowchart diagram of the image transmission method provided by the embodiment of the present disclosure.

Referring to FIG. 14, the FIG. 14 shows a flowchart of the image transmission method provided by an embodiment of the present disclosure, wherein the image transmission method includes:

S210, after the first device compresses the image data into image block, storing the image block based on the image management chip.

In the embodiment, the first device 310 may compress the image data, so that the image data is compressed to image blocks for transmission. Since the image block transmission needs to convert the image blocks into the arrangement of linear order, the image block may be stored based on the image management chip. Since the image blocks are stored in the image management chip by utilizing the memory 110, compared with the register, the memory 110 occupies a smaller chip area for storing the same data, which facilitates a back-end design of the circuit.

S220, the second device sending the reading instruction to the image management chip to read the image block from the image management chip.

In the embodiment, the second device 320 may be the receiver during the image transmission, and the second device 320 may be connected to information buffer 140, the address resource pool 120 and the memory 110 in the image management chip to send the reading instruction to acquire the address from the information buffer 140, then read the image block from the memory 110 according to the address, and release the address particles corresponding to the memory region after the image has been read back into the address resource pool 120.

Based on the same inventive concept, the embodiments of the present disclosure also provide an electronic device which may include the image management chip provided by foregoing embodiments, wherein the electronic device may be various types of devices in which the image needs to be transmitted.

The technical features of the above embodiments may be freely combined without conflict, and the embodiments obtained by the combination are covered within the protective scope of the present disclosure.

The above mentioned are only specific embodiments of the present disclosure, but the protective scope of the present disclosure is not limited thereto, and variations or substitutions that can easily be thought out by any person skilled in the art within the scope of the technology disclosed by the present disclosure shall all be covered in the protective scope of the present disclosure. Therefore, the protective scope of the present disclosure shall be subject to the protective scope of claims.

It is to be noted that, as used herein, the terms "include", "contain", or any other variant thereof, are intended to cover non-exclusive inclusion, such that a process, method, object or apparatus including a set of elements not only includes those elements, but also includes other elements that are not expressly listed, or the elements that are inherent to the process, method, object or apparatus. Without further limitation, the element is defined by phrase "include a" does not exclude the existence of other same element in the process, method, object or apparatus that including the element.

What is claimed is:

1. An image management method, comprising:

assigning an address particle for an image block in response to a writing of the image block, wherein each address particle is corresponding to different memory regions in a memory respectively, and the address particle is data recording an address of a corresponding memory region; and the memory comprises a plurality of memory regions of first preset size;

storing the image block into a memory region corresponding to the address particle; and when the memory region corresponding to the address particle is full with data of the image block, writing an address of the memory region corresponding to the address particle into a preset information buffer, wherein the information buffer is configured to provide an acquirer of the image block with the address of the memory region corresponding to the address particle; and the acquirer is configured to acquire the image block from the memory based on the address of the memory region corresponding to the address particle;

wherein, before assigning the address particle to the image block, the method further comprises:

determining a configuration parameter of the memory according to a preset conversion format, wherein the configuration parameter is configured to configure the memory, wherein the preset conversion format is a preset compression format of the image block, and the preset conversion format comprises a maximum image width of the image block and an arrangement of a Y-component and an UV-component of a pixel point of the image block; and the Y-component is a brightness of the pixel point, and the UV-component is a chromaticity of the pixel point; and the configuration parameter of the memory comprises a number, a width and a depth of memory units in the memory; and the memory is composed of multiple pieces of memory units, and a total storage space of the multiple pieces of memory units is divided into a plurality of memory regions.

2. The image management method according to claim 1, after determining the configuration parameter of the memory according to the preset conversion format, wherein the method further comprises:

providing the number of the address particle and the first preset size based on the configuration parameter of the memory and the preset conversion format.

3. The image management method according to claim 1, wherein the information buffer comprises a plurality of information memories corresponding to the Y-component and a plurality of information memories corresponding to the UV-component, wherein writing the address of the memory region corresponding to the address particle into the preset information buffer comprises:

writing the address corresponding to the memory region into an information buffer corresponding to a component type according to the component type of a pixel point written into the memory region, wherein the component type of the pixel point comprises the Y-component and the UV-component.

4. An image management method, comprising:

assigning an address particle for an image block in response to a writing of the image block, wherein each address particle is corresponding to different memory regions in a memory respectively, and the address particle is data recording an address of a corresponding memory region; and the memory comprises a plurality of memory regions of first preset size;

storing the image block into a memory region corresponding to the address particle; and when the memory region corresponding to the address particle is full with data of the image block, writing an address of the memory region corresponding to the address particle into a preset information buffer, wherein the information buffer is configured to provide an acquirer of the image block with the address of the memory region corresponding to the address particle; and the acquirer is configured to acquire the image block from the memory based on the address of the memory region corresponding to the address particle;

after writing the particle information of the address particle into the preset information buffer, wherein the method further comprises:

providing the acquirer with the address of the memory region corresponding to the address particle through the information buffer, so that the acquirer reads the image block from the memory region based on the address of the memory region corresponding to the address particle; and releasing the address particle corresponding to the memory region in response to a reading out of the image block in the memory region, wherein the released address particle characterizes that the memory region corresponding to the address particle is allowed to be written a new image block.

5. The image management method according to claim 4, wherein the image block comprises a UV-component, and the UV-component is a chromaticity of a pixel point; multiple information memories are provided; and before releasing the address particle, the method further comprises that:

when determining whether or not the UV-component read out needs to be reused based on an initial format when the image block is written in and a target format when the image block is written out, the address of the memory region corresponding to the address particle is rewritten into a next information buffer.

6. The image management method according to claim 4, wherein a written image block comprises a plurality of image blocks, and before assigning the address particle for the image block, the method further comprises:

shifting the plurality of image blocks and stitching them as an image block of a second preset size; and accordingly, after providing the acquirer with the address of the memory region corresponding to the address particle through the information buffer, the method further comprises:

shifting image blocks in the memory region corresponding to the address particle to restore an arrangement order of the image blocks to an order when input.

7. An image management chip, comprising:

a memory, comprising a plurality of memory regions of a first preset size;

an address resource pool, storing a plurality of address particles, wherein different address particles are corresponding to different memory regions; and the address particles are data recording addresses of corresponding memory regions;

a writing memory module, connected to the address resource pool and the memory; and a plurality of information memories, wherein each of the information memories is connected to the writing memory module, wherein the writing memory module is configured to receive a written image block;

the address resource pool is configured to assign an address particle to the image block in response to a writing of the image block;

the writing memory module is further configured to store the image block into a memory region corresponding to the address particle; and the writing memory module is further configured to write an address of the memory region corresponding to the address particle into an information buffer when the memory region corresponding to the address particle is full with data of the image block; the information buffer is configured to provide an acquirer of the image block with the address of the memory region corresponding to the address particle; and the acquirer is configured to acquire the image block from the memory based on the address of the memory region corresponding to the address particle;

wherein the memory is configured to determine a configuration parameter of the memory based on a preset conversion format; and the configuration parameter is used to configure the memory;

the preset conversion format is a preset compression format of the image block, and the preset conversion format comprises a maximum image width of the image block and an arrangement of Y-component and UV-component of a pixel point in the image block; and the Y-component is a brightness of the pixel point, and the UV-component is a chromaticity of the pixel point; and the configuration parameter of the memory comprises a number, a width and a depth of memory units in the memory; the memory is composed of multiple pieces of memory units, a total storage space of the multiple pieces of memory units is divided into a plurality of memory regions.

8. The image management chip according to claim 7, wherein the memory is further configured to provide the number of the address particles and the first preset size based on the configuration parameter of the memory and the preset conversion format.

9. The image management chip according to claim 7, wherein the plurality of information memories comprise a plurality of information memories corresponding to the Y-component and a plurality of information memories corresponding to the UV-component; and the writing memory module is further configured to comprise: writing the address corresponding to the memory region into an information buffer corresponding to a component type according to the component type of a pixel point written into the memory region, wherein the component type of the pixel point comprises the Y-component and the UV-component.

10. An electronic device, comprising: the image management chip according to claim 7.

11. The electronic device according to claim 10, wherein the memory is further configured to provide the number of the address particles and the first preset size based on the configuration parameter of the memory and the preset conversion format.

12. The electronic device according to claim 10, wherein the plurality of information memories comprise a plurality of information memories corresponding to the Y-component and a plurality of information memories corresponding to the UV-component; and the writing memory module is further configured to comprise: writing the address corresponding to the memory region into an information buffer corresponding to a component type according to the component type of a pixel point written into the memory region, wherein the component type of the pixel point comprises the Y-component and the UV-component.

13. An image management chip, comprising:

a memory, comprising a plurality of memory regions of a first preset size;

an address resource pool, storing a plurality of address particles, wherein different address particles are corresponding to different memory regions; and the address particles are data recording addresses of corresponding memory regions;

a writing memory module, connected to the address resource pool and the memory; and a plurality of information memories, wherein each of the information memories is connected to the writing memory module, wherein the writing memory module is configured to receive a written image block;

the address resource pool is configured to assign an address particle to the image block in response to a writing of the image block;

the writing memory module is further configured to store the image block into a memory region corresponding to the address particle; and the writing memory module is further configured to write an address of the memory region corresponding to the address particle into the information buffer when the memory region corresponding to the address particle is full with data of the image block; the information buffer is configured to provide an acquirer of the image block with the address of the memory region corresponding to the address particle; and the acquirer is configured to acquire the image block from the memory based on the address of the memory region corresponding to the address particle;

wherein the image management chip further comprises:

a reading memory module, configured to be connected to the memory, the address resource pool, and the information buffer respectively, wherein the reading memory module is configured to be the acquirer;

the reading memory module is further configured to acquire the address of the memory region corresponding to the address particle stored in the information buffer, and to read the image block of the memory region corresponding to the address particle from the memory and output based on the address of the memory region corresponding to the address particle; and the reading memory module is further to configured to release the address particle corresponding to the memory region in response to a reading out of the image block in the memory region, wherein the released address particle characterizes that the memory region corresponding to the address particle is allowed to be written a new image block.

14. The image management chip according to claim 13, wherein the image block comprises a UV-component, and the UV-component is a chromaticity of a pixel point; the memory is further configured such that: when determining whether or not the UV-component read out needs to be reused based on an initial format when the image block is written in and a target format when the image block is written out, the address of the memory region corresponding to the address particle is rewritten into a next information buffer.

15. The image management chip according to claim 13, wherein the image management chip further comprises:

an input data shifting module, configured to be connected to the writing memory module and receive a written image block, and shift a plurality of input image blocks and stitch them as an image block of a second preset size; and an output data shifting module, connected to the reading memory module and configured to shift an image block output from the reading memory module, so to restore a pixel of the image block as an order when input.

16. An electronic device, comprising: the image management chip according to claim 13.

17. The electronic device according to claim 16, wherein the image block comprises a UV-component, and the UV-component is a chromaticity of a pixel point; the memory is further configured such that: when determining whether or not the UV-component read out needs to be reused based on an initial format when the image block is written in and a target format when the image block is written out, the address of the memory region corresponding to the address particle is rewritten into a next information buffer.

* * * * *